(12) United States Patent
Byrnes et al.

(10) Patent No.: US 10,623,360 B2
(45) Date of Patent: Apr. 14, 2020

(54) AUTOMATIC CONFIGURATION OF EMAIL CLIENT

(75) Inventors: Sean N. Byrnes, San Francisco, CA (US); Gabriel Vanrenen, San Francisco, CA (US); Karl Harris, Austin, TX (US)

(73) Assignee: OATH INC., New York, NY (US)

( * ) Notice: Subject to any disclaimer, the term of this patent is extended or adjusted under 35 U.S.C. 154(b) by 956 days.

(21) Appl. No.: 11/604,193

(22) Filed: Nov. 21, 2006

(65) Prior Publication Data

US 2019/0044901 A1    Feb. 7, 2019

(51) Int. Cl.
| | | |
|---|---|---|
| G06F 15/173 | (2006.01) | |
| H04L 12/58 | (2006.01) | |
| H04L 12/24 | (2006.01) | |
| H04L 29/08 | (2006.01) | |
| H04L 12/26 | (2006.01) | |

(52) U.S. Cl.
CPC .......... H04L 51/22 (2013.01); H04L 41/0806 (2013.01); H04L 41/0869 (2013.01); H04L 41/0883 (2013.01); H04L 43/10 (2013.01); H04L 51/28 (2013.01); H04L 67/34 (2013.01)

(58) Field of Classification Search
CPC ..... G06Q 10/107; H04L 63/08; H04L 63/083; H04L 51/22; H04M 3/533
USPC ........................................................ 709/224
See application file for complete search history.

(56) References Cited

U.S. PATENT DOCUMENTS

| | | | | |
|---|---|---|---|---|
| 6,029,196 | A * | 2/2000 | Lenz | 709/221 |
| 7,286,489 | B2 * | 10/2007 | Ades | H04L 41/0806 370/254 |
| 7,555,474 | B2 * | 6/2009 | Byers | G06F 17/30864 |
| 8,412,822 | B1 * | 4/2013 | Weinman, Jr. | G06F 9/5027 709/201 |
| 2002/0177910 | A1 * | 11/2002 | Quarterman | H04L 43/50 700/28 |
| 2005/0038858 | A1 * | 2/2005 | Gardner et al. | 709/206 |
| 2006/0031358 | A1 * | 2/2006 | Canis | 709/206 |
| 2006/0200524 | A1 * | 9/2006 | Costenaro et al. | 709/206 |
| 2007/0073819 | A1 * | 3/2007 | Gardner et al. | 709/206 |
| 2007/0192766 | A1 * | 8/2007 | Padalia | G06F 17/5054 718/105 |
| 2008/0082661 | A1 * | 4/2008 | Huber | 709/224 |

OTHER PUBLICATIONS

ClickZ, "IMAP vs. POP3", May 20, 2002, pp. 1-3.*

* cited by examiner

*Primary Examiner* — Ryan J Jakovac
(74) *Attorney, Agent, or Firm* — James J. DeCarlo; Greenberg Traurig, LLP

(57) ABSTRACT

A method of configuring an email client is disclosed. An email address is received. The email address is parsed to obtain a domain. A mailserver configuration is generated based on the domain. The email client is configured according to the mailserver configuration.

14 Claims, 5 Drawing Sheets

AUTOMATIC CONFIGURATION OF EMAIL CLIENT

BACKGROUND OF THE INVENTION

A common problem when using an email client program is the initial configuration to allow the email client program to work with an email provider's mailserver. Often a user is presented with a complex set of configuration menus requiring technical knowledge or assistance beyond that normally required by a computer user. Furthermore, even if a user can successfully configure an email client, there is no guarantee that the configuration gives the user the most secure or highest performance configuration available. Therefore, there exists a need to simplify configuring an email client with the settings for the greatest user benefit.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
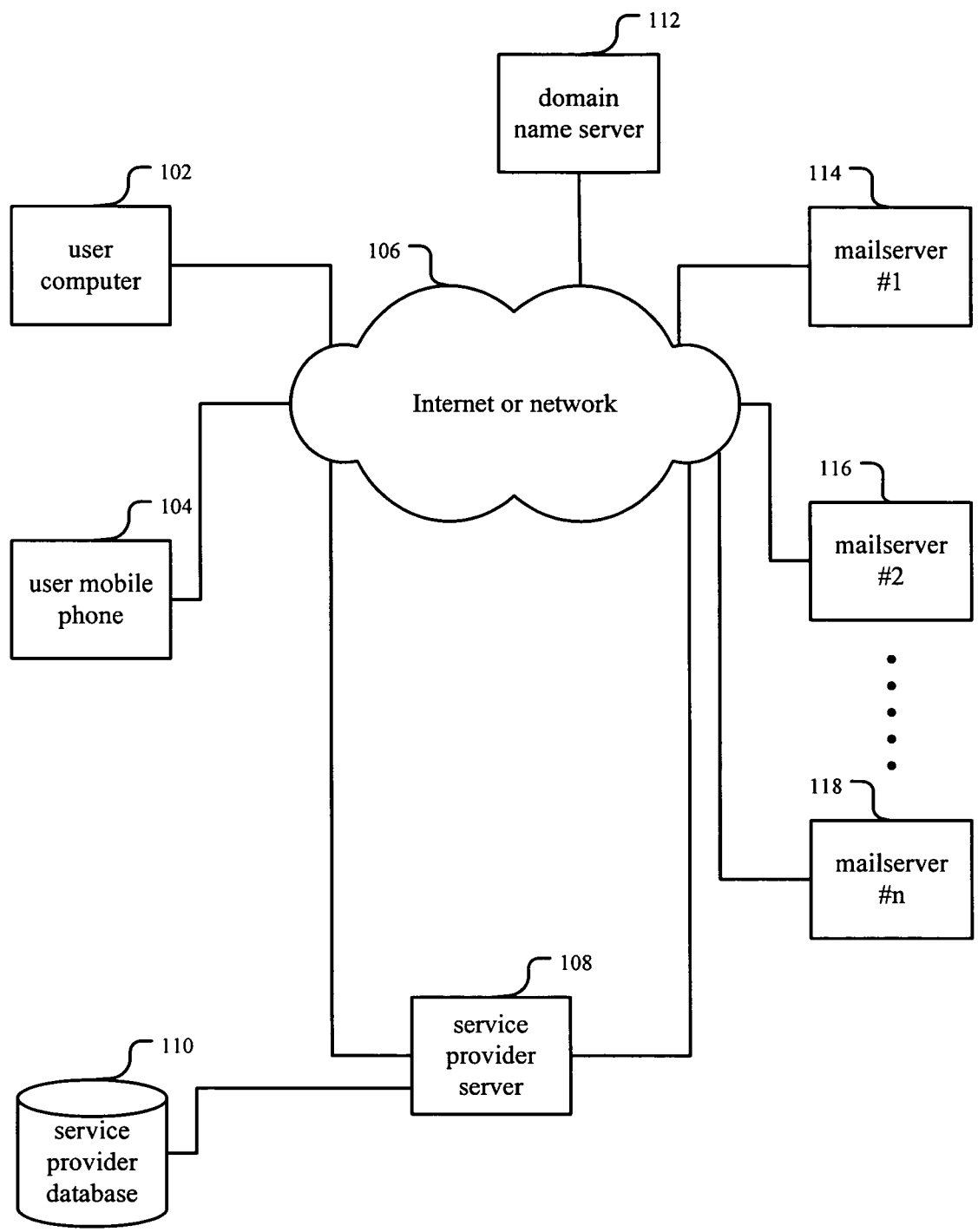
FIG. 1 is a block diagram illustrating an embodiment of a system for a service provider to automatically configure an email client.

FIG. 1 is a block diagram illustrating an embodiment of a system for a service provider to automatically configure an email client. User computer 102, user mobile device 104, service provider server 108, domain name server 112, and many mailservers (here depicted 114, 116 and 118) are connected through network 106, a public or private network and/or combination thereof, for example the Internet, an Ethernet, serial/parallel bus, intranet, NAS, SAN, LAN, WAN, and other forms of connecting multiple systems and/or groups of systems together. In some embodiments, the service provider server 108 may include a service provider user portal for web browsers. In some embodiments, user computer 102 may be another mobile device or any network-capable device.

To automatically configure an email client, the user computer 102 or user mobile phone 104 accesses the service provider server 108 through the network 106. The user enrolls for an account with the service provider, and the enrollment information includes the user's current email address. The service provider server 108 looks up the service provider database 110 to see if the user's current email address is related to a known email client configuration.

If the user's current email address is not related to a known email client configuration, the service provider server 108 then applies a heuristic to generate possible mailserver configurations by contacting the network's domain name server 112, and pinging a large number of mailservers, here depicted 114, 116, and 118. After generating a set of possible mailserver configurations, the service provider server 108 confirms the set of possible mailserver configurations by attempting to log in with email account information provided by the user at enrollment.

During the confirmation process, the service provider server 108 prioritizes testing for more secure and faster email client configurations. In some embodiments, the confirmation process is performed in parallel to decrease the time a user waits for the overall process. If a mailserver configuration is confirmed, the email client is automatically configured with the most secure and fastest settings. If a mailserver configuration cannot be confirmed, the service provider 108 contacts the user computer 102 or user mobile phone 104 for the explicit details to configure the email client.

Figure 2:
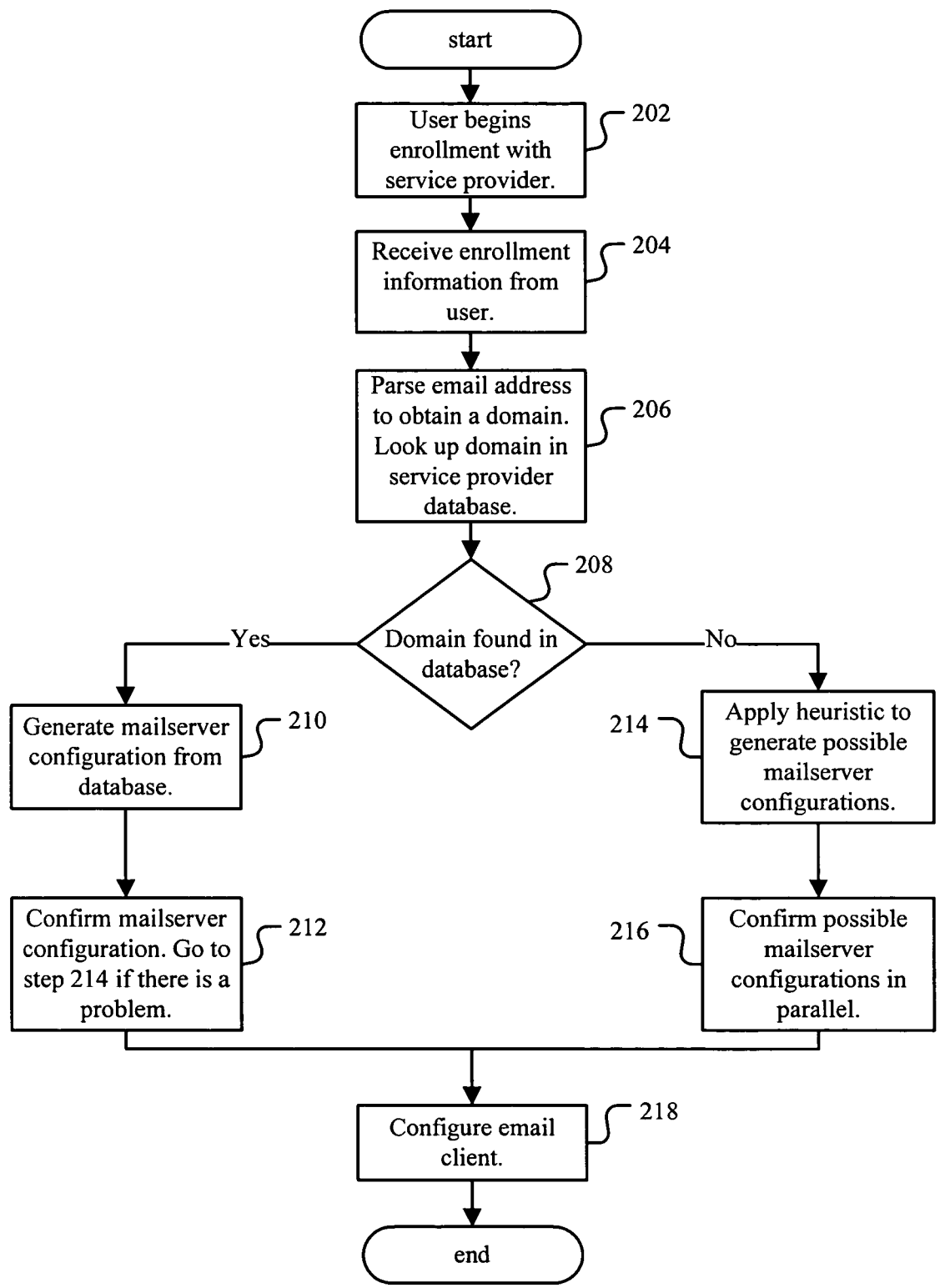
FIG. 2 is a flowchart illustrating an embodiment of a process for a service provider to automatically configure a user's email client.

FIG. 2 is a flowchart illustrating an embodiment of a process for a service provider to automatically configure a user's email client. The process may be implemented in service provider server 108.

In a step 202, the user enrolls with the service provider using user computer 102 or user mobile phone 104. In some embodiments, the enrollment is through a web browser over the Internet 106. In a step 204, the enrollment includes receiving a user's current email account information and auxiliary information. In some embodiments, the current email account information includes both a user email address and a user password associated with the user's current email account. In some embodiments, the auxiliary information includes the user's name, service provider identification handle (ID), mobile phone number, and wireless carrier.

In a step 206, the service provider server 108 parses a domain from the user email address. In some embodiments, parsing includes retaining the portion of the user email address after the @ sign; for example if the user email address is "user.name@domain.name", the parsed domain is "domain.name". The domain is then looked up in the service provider database 110. If it is determined at step 208 that the domain is found in the service provider database 110, then control is transferred to step 210. If it is determined at step 208 that the domain is not found in the service provider database 110, then control is transferred to step 214.

In a step 210, the service provider server 108 finds a mailserver configuration in service provider database 110, which contains previously determined mailserver configurations associated with previously determined domains.

In a step 212, the service provider server 108 confirm the mailserver configuration by discreetly accessing the user's current email account without disrupting a user's email. If accessing the user's current email account is not successful, the problem is noted in the service provider domain database 110 and control is transferred to step 214. If accessing the user's current email account is successful, control is transferred to step 218.

In a step 214, the service provider server 108 applies a heuristic to generate many possible mailserver configurations. The heuristic uses the domain and the domain name server 112 to generate a list of potential possible mailserver configurations which it pings to determine whether the mailserver actually exists. At this stage, speed is important, and the pings are simply to indicate whether a mailserver actually exists, rather than indicating a full confirmation of the user's current email account. The list of possible mailserver configurations are the potential possible mailserver configurations that exist.

In a step 216, the service provider server 108 takes the list of possible mailserver configurations from step 214 and confirms each possible mailserver configuration by discreetly accessing the user's current email account. Step 216 is resource intensive, and in some implementations, parallel threads are used to improve performance and reduce the user's waiting time. If no mailserver configuration can be accessed, or confirmed, the user is prompted for an explicit mailserver configuration until one can be confirmed. In a step 218, the email client is configured using the confirmed mailserver configuration from step 212 or step 216.

Figure 3:
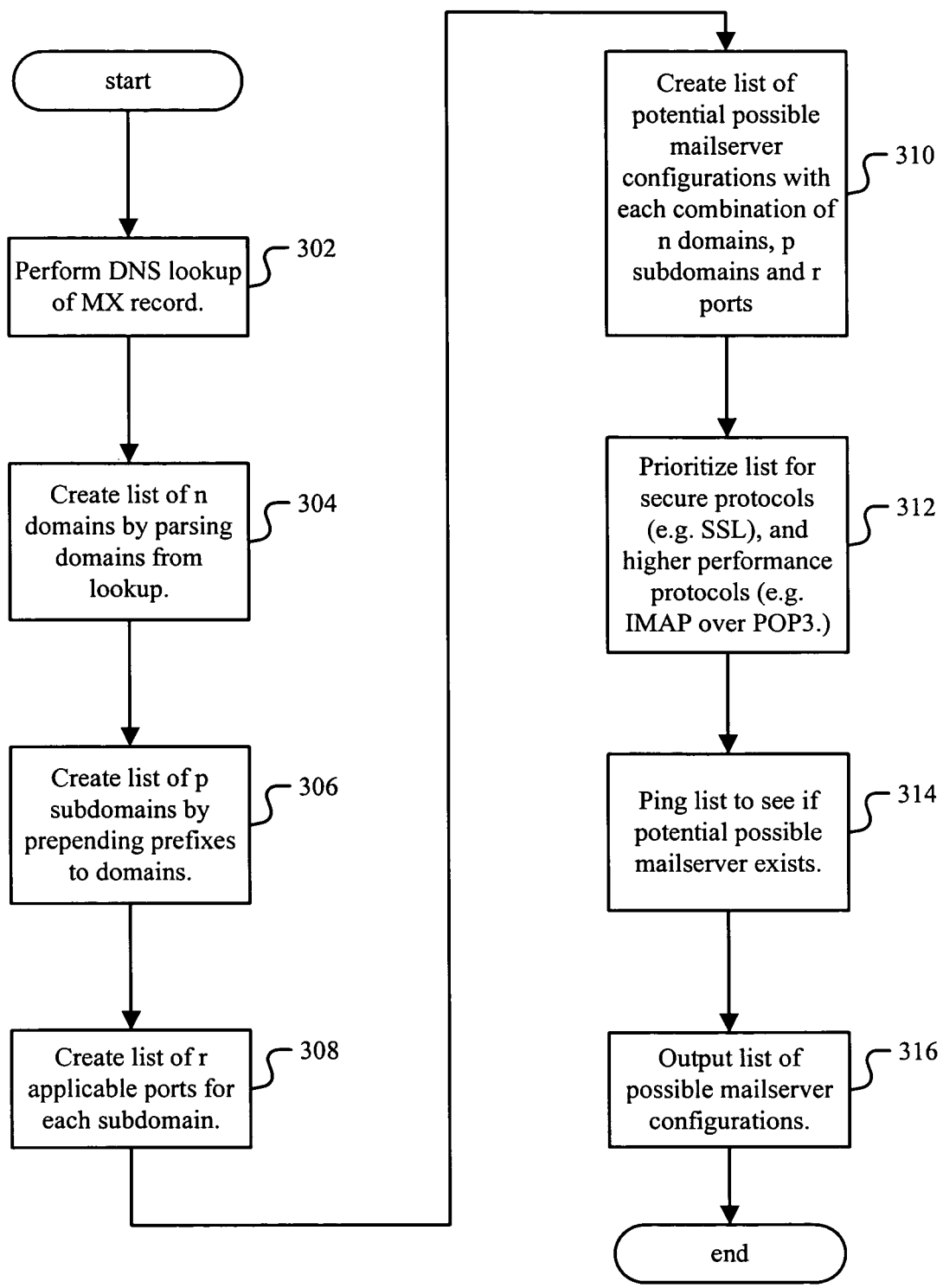
FIG. 3 is a flowchart illustrating an embodiment of a process for a service provider to apply a heuristic to generate many possible mailserver configurations.

FIG. 3 is a flowchart illustrating an embodiment of a process for a service provider to apply a heuristic to generate many possible mailserver configurations. In some embodiments, the process of FIG. 3 is included in 214 of FIG. 2. The process may be implemented in service provider server 108.

In a step 302, the service provider server 108 performs a lookup of the domain from step 206 using domain name server 112. In some embodiments, the domain name server 112 uses the Domain Name System (or DNS) and the lookup includes the Mail eXchange (or MX) records for the domain. In a step 304, the results of the domain name server lookup are parsed to create a list of n possible domains.

In a step 306, a list of p subdomain prefixes are prepended to a possible domain. In some embodiments, prefixes might include technically related words, for example for a possible domain "domain.com", four subdomains might include "mail.domain.com", "imap.domain.com", "pop.domain.com", and "pop3.domain.com."

In a step 308, a list of r applicable ports for each possible subdomain are added. In some embodiments, the applicable ports for an IMAP subdomain would include port 993 for an IMAP protocol over Secure Sockets Layer (or SSL, and port 143. In some embodiments, the applicable ports for a POP3 subdomain would include port 995 for a POP3 protocol over SSL and port 110. In a step 310, the list of potential possible mailserver configurations is created using the applicable combination of the n domains, p subdomains and r ports.

In a step 312, the list of potential possible mailserver configurations is checked to give priority for greater email client benefit, including prioritizing encrypted over unencrypted mail protocol and prioritizing higher performance mail protocol. In some embodiments, SSL potential possible mailserver configurations would be prioritized over unencrypted potential possible mailserver configurations. In some embodiments, IMAP potential possible mailserver configurations would be prioritized over POP3 potential possible mailserver configurations.

In a step 314, the list of potential possible mailserver configurations is pinged to determine if a mailserver exists. In some implementations pings include using Internet Control Message Protocol (ICMP) echo request and response packets. In some implementations pings include using simple generic IMAP or POP3 commands. In a step 316, the output list of possible mailserver configurations are the potential possible mailserver configurations whose mailservers exist.

Figure 4:
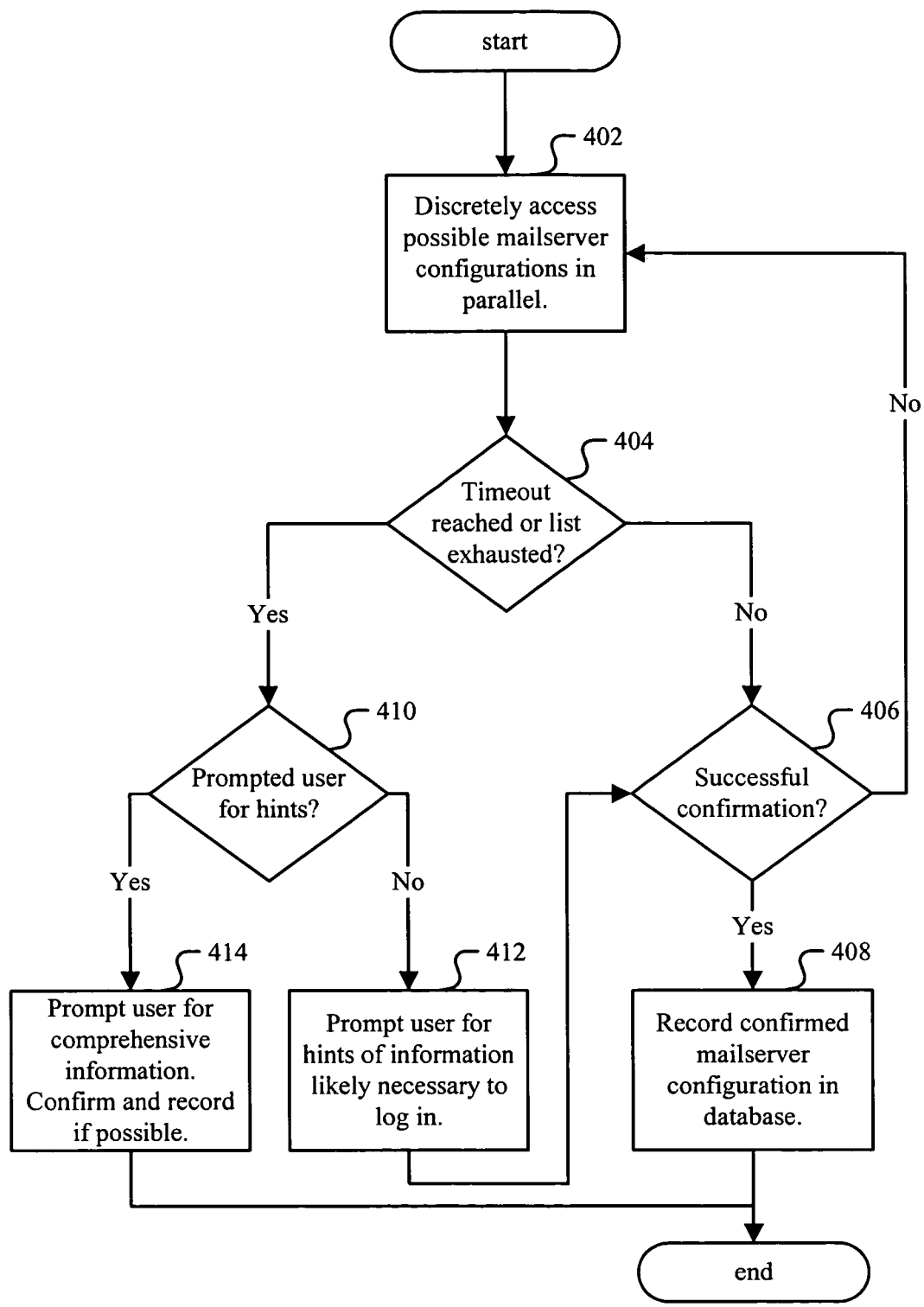
FIG. 4 is a flowchart illustrating an embodiment of a process for a service provider to confirm the list of possible mailserver configurations.

FIG. 4 is a flowchart illustrating an embodiment of a process for a service provider to confirm the list of possible mailserver configurations. In some embodiments, the process of FIG. 4 is included in 216 of FIG. 2. The process may be implemented in service provider server 108.

In a step 402, the service provider server 108 takes the list of possible mailserver configurations from step 214 and confirms each possible mailserver configuration by discreetly accessing the user's current email account. In some embodiments, a way to discreetly access the user's current email account includes getting Internet Message Access Protocol (or IMAP) folder information in the user's current email account, or opening a Post Office Protocol version 3 (or POP3) Inbox in the user's current email account. Step 402 is resource intensive, and in some implementations, parallel threads are used to improve performance and reduce the user's waiting time, and in these implementations, resource management must be implemented to manage the threads and degree of parallelism. Generally, rather than failing explicitly, the service provider sets a predetermined threshold on how long to make the user wait for confirmation process, so that the list is not always exhausted but rather the confirmation process reaches a timeout, or no success before the threshold.

If it is determined at step 404 that the timeout was not yet reached or the list of possible mailserver configurations is not exhausted, then control is transferred to step 406. If it is determined at step 404 that the timeout was reached or the list of possible mailserver configurations is exhausted, then control is transferred to step 410.

If it is determined at step 406 that a possible mailserver configuration was accessed successfully, then control is transferred to step 408. If it is determined at step 406 that a possible mailserver configuration was not accessed successfully, then the possible mailserver configuration is discarded and control is transferred to step 402. In a step 408, the confirmed mailserver configuration is recorded in the service provider database 110 for future user's email accounts from the same domain, and the user may be notified that the automatic configuration of the email client is finished.

If it is determined at step 410 that the user has not been prompted for hints, then control is transferred to step 412. In a step 412, the user is prompted for hints. Hints are a less technical, more user-accessible subset of additional information that is most likely needed for successful mailserver configuration. In some embodiments, hints can include requesting the user to retype the password. Control is transferred back to step 406 to attempt to reconfirm the possible mailserver configuration with the hints.

If it is determined at step 410 that the user has already been prompted for hints, then control is transferred to step 414. In a step 414, the user is prompted for a comprehensive mailserver configuration information. In some embodiments, this comprehensive configuration information includes a mailserver subdomain, mailserver domain, mailserver port, account password, encryption and protocol information. With the comprehensive configuration information the service provider server 108 attempts to successfully access the mailserver. This access can involve using the comprehensive configuration information directly or by trying permutations by varying the comprehensive configuration information. In some embodiments, a permutation would include the mailserver domain with a different subdomain and protocol.

If the access is successful, the confirmed mailserver configuration is recorded in the service provider database 110 for future user's email accounts from the same domain, and the user may be notified that the automatic configuration of the email client is finished. If the access is not successful, the user may be notified that configuration of the email client is not currently possible.

Figure 5:
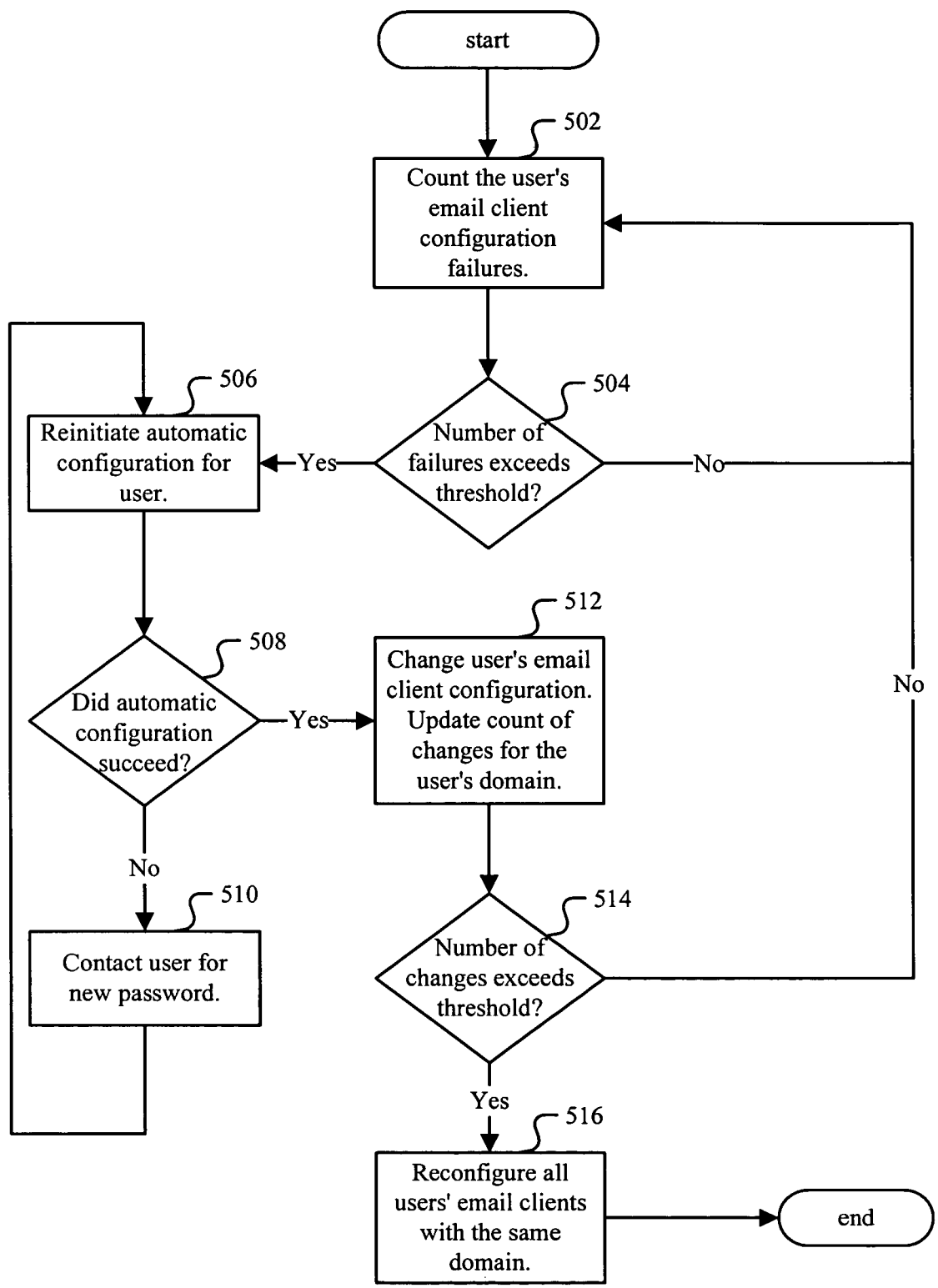
FIG. 5 is a flowchart illustrating an embodiment of a process for a service provider to maintain the email client.

FIG. 5 is a flowchart illustrating an embodiment of a process for a service provider to maintain the email client. Maintenance of the email client may occur periodically or indefinitely as a service to current and future users. The process may be implemented in service provider server 108.

In a step 502, the number of times a user's email client configuration fails is counted. In some embodiments this count may be a rolling count that resets to zero after a predetermined period of time. If it is determined in a step 504 that the number of failures exceeds a predetermined failure threshold number, then control is transferred to step 506. If it is determined in a step 504 that the number of failures does not exceed the predetermined failure threshold number, then after a waiting period, control is transferred back to step 502.

In a step 506, the automatic configuration process of step 214 and step 216 is reinitiated. If it is determined in step 508 that the automatic configuration process does not succeed, then control is transferred to step 510. If it is determined in step 508 that the automatic configuration process does succeed, then control is transferred to step 512.

In a step 510, the service provider server 108 contacts the user for a new password. In some embodiments the service provider server 108 may contact the user using e-mail, messaging, or by web browser. Control is transferred back to step 506 to retry the automatic configuration process.

In a step 512, the user's email client configuration is updated and the service provider database 110 is updated for future user's email accounts from the same domain. The count of changes for the user's domain is incremented accordingly. If it is determined in step 514 that the number of changes exceeds a predetermined change threshold, then control is transferred to step 516. If it is determined in step 514 that the number of changes does not exceed a predetermined change threshold, then after a waiting period, control is transferred back to step 502.

In a step 516, the service provider server 108 determines that a systematic change has occurred for all email clients with the particular domain. The service provider server 108 then reconfigures all users' email clients with the particular domain using the revised configuration information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
identifying, by a computing device over a network, an email address associated with a user, said email address associated with a domain corresponding to an email provider;
determining, by the computing device, that the email address is not associated with any known email client configuration, said determination comprising parsing said email address to identify said domain;
generating, by the computing device, a plurality of potential mailserver configurations based on said domain, said generation further comprising identifying information related to a mail protocol type, security and speed of each potential mailserver configuration;
testing, by the computing device, each potential mailserver configuration in parallel over the network, said testing comprising:
discretely attempting to log into to the domain associated with the email address using each potential mailserver configuration simultaneously, and
determining, based on each of said parallel, simultaneous and discrete login attempt using each potential mail server configuration, which mailserver configurations are confirmed as active on said network;
determining, by the computing device, a prioritized set of mailserver configurations based on said parallel testing and the mail protocol type, security and speed information;
identifying, by the computing device, from the prioritized set of mailserver configurations;
confirming, by the computing device over the network, the email account associated with said email address using said identified mailserver configuration by simultaneously confirming, via parallel threads, at least two or more email accounts associated with a different potential mailserver configuration; and
configuring, by the computing device, an email client with said confirmed email account using said identified mailserver configuration.

2. The method of claim 1, wherein said confirmation is based on a received password associated with said email account.

3. The method of claim 1, further comprising:
determining that the email address is associated with a known email client configuration; and
configuring the email client based at least in part on the known email client configuration.

4. The method of claim 1, further comprising:
receiving email provider account information, said information comprising a username and password.

5. The method of claim 1, wherein said generated plurality of mailserver configurations comprises at least a subset of configurations that are variations within a given mail protocol.

6. The method of claim 5, wherein said variations are associated with a subdomain of the domain.

7. A non-transitory computer-readable storage medium tangibly encoded with computer-executable instructions, that when executed by a computing device, perform a method comprising:

identifying, over a network, an email address associated with a user, said email address associated with a domain corresponding to an email provider;

determining that the email address is not associated with any known email client configuration, said determination comprising parsing said email address to identify said domain;

generating a plurality of potential mailserver configurations based on said domain, said generation further comprising identifying information related to a mail protocol type, security and speed of each potential mailserver configuration;

testing each potential mailserver configuration in parallel over the network, said testing comprising:
  discretely attempting to log into to the domain associated with the email address using each potential mailserver configuration simultaneously, and
  determining, based on each of said parallel, simultaneous and discrete login attempt using each potential mail server configuration, which mailserver configurations are confirmed as active on said network;

determining a prioritized set of mailserver configurations based on said parallel testing and the mail protocol type, security and speed information;

identifying from the prioritized set of mailserver configurations, a mailserver configuration that is active on the network;

confirming, over the network, an email account associated with said email address using said identified mailserver configuration by simultaneously confirming, via parallel threads, at least two or more email accounts associated with a different potential mailserver configuration; and configuring an email client with said confirmed email account using said identified mailserver configuration.

8. The non-transitory computer-readable storage medium of claim 7, further comprising:
determining that the email address is associated with a known email client configuration; and
configuring the email client based at least in part on the known email client configuration.

9. The non-transitory computer-readable storage medium of claim 7, further comprising:
receiving email provider account information, said information comprising a username and password.

10. The non-transitory computer-readable storage medium of claim 7, wherein said generated plurality of mailserver configurations comprises at least a subset of configurations that are variations within a given mail protocol, wherein said variations are associated with a subdomain of the domain.

11. A system comprising:
a processor; and
a non-transitory computer-readable storage medium for tangibly storing thereon program logic for execution by the processor, the program logic comprising:
  identification logic executed by the processor for identifying, over a network, an email address associated with a user, said email address associated with a domain corresponding to an email provider;
  determination logic executed by the processor for determining that the email address is not associated with any known email client configuration, said determination comprising parsing said email address to identify said domain;
  generation logic executed by the processor for generating a plurality of potential mailserver configurations based on said domain, said generation further comprising identifying information related to a mail protocol type, security and speed of each potential mailserver configuration;
  testing logic executed by the processor for testing each potential mailserver configuration in parallel over the network, said testing logic comprising:
    logic executed by the processor for discretely attempting to log into to the domain associated with the email address using each potential mailserver configuration simultaneously, and
    logic executed by the processor for determining, based on each of said parallel, simultaneous and discrete login attempt using each potential mail server configuration, which mailserver configurations are confirmed as active on said network;
  determination logic executed by the processor for determining a prioritized set of mailserver configurations based on said parallel testing and the mail protocol type, security and speed information;
  identification logic executed by the processor for identifying from the prioritized set of mailserver configurations, a mailserver configuration that is active on the network
  confirmation logic executed by the processor for confirming, over the network, an email account associated with said email address using said identified mailserver configuration by simultaneously confirming, via parallel threads, at least two or more email accounts associated with a different potential mailserver configuration; and
  configuration logic executed by the processor for configuring an email client with said confirmed email account using said identified mailserver configuration.

12. The system of claim 11, further comprising:
determination logic executed by the processor for determining that the email address is associated with a known email client configuration; and
configuration logic executed by the processor for configuring the email client based at least in part on the known email client configuration.

13. The system of claim 11, further comprising:
receiving logic executed by the processor for receiving email provider account information, said information comprising a username and password.

14. The system of claim 11, wherein said generated plurality of mailserver configurations comprises at least a subset of configurations that are variations within a given mail protocol, wherein said variations are associated with a subdomain of the domain.

* * * * *